United States Patent [19]
Szekely

[11] Patent Number: 5,303,669
[45] Date of Patent: Apr. 19, 1994

[54] TILES FOR PEDESTRIAN PLATFORMS AND WALKWAYS

[76] Inventor: Kenneth E. J. Szekely, 5 Third Line, Oakville, Ontario, Canada, L61L 3Z3

[21] Appl. No.: 953,983

[22] Filed: Sep. 30, 1992

Related U.S. Application Data

[63] Continuation-in-part of Ser. No. 802,228, Dec. 4, 1991, abandoned.

[30] Foreign Application Priority Data

Dec. 18, 1990 [CA] Canada .................................. 2032532

[51] Int. Cl.⁵ ....................... G09B 21/00; E04F 15/00
[52] U.S. Cl. ............................. 116/205; 116/DIG. 17
[58] Field of Search .................... 52/177, 181, 391; 116/205, DIG. 17; 404/9, 15, 39, 42, 32, 33; 434/112

[56] References Cited

U.S. PATENT DOCUMENTS

| | | | |
|---|---|---|---|
| 691,434 | 1/1902 | Barnett | 52/177 |
| 1,051,354 | 1/1913 | Strachan | 40/612 |
| 4,080,087 | 3/1978 | Phillips | 404/72 |
| 4,620,816 | 11/1986 | Kufer | 404/6 |
| 4,715,743 | 12/1987 | Schmanski | 404/9 |

FOREIGN PATENT DOCUMENTS

| | | | |
|---|---|---|---|
| 2155082 | 5/1973 | Fed. Rep. of Germany | 52/177 |
| 0195326 | 3/1923 | United Kingdom | 404/32 |

*Primary Examiner*—William A. Cuchlinski, Jr.
*Assistant Examiner*—W. Morris Worth
*Attorney, Agent, or Firm*—R. Craig Armstrong

[57] ABSTRACT

A marking tile is disclosed, for use in conjunction with pedestrian platforms and walkways. The preferred embodiment of the tile has a plurality of buttons or longitudinal strips projecting upwardly therefrom to provide a distinctively textured upper surface. The upward projections are of a lower height adjacent each exposed edge than elsewhere on the tile. An integral flange, vertical or angled away from the vertical, projects downwardly from each exposed edge. The edges of the tile which are exposed to pedestrian traffic may have a downwardly angled portion such that the height of the upper surface of the tile at the exposed edge is substantially at the height of the lower surface of the rest of the tile, so that the edge may be installed flush with the platform or walkway if the surface of the platform or walkway is bevelled beneath the angled portion. The button surfaces and the surface of the tile between the buttons are provided with a plurality of small upward projections to texture the surfaces.

13 Claims, 15 Drawing Sheets

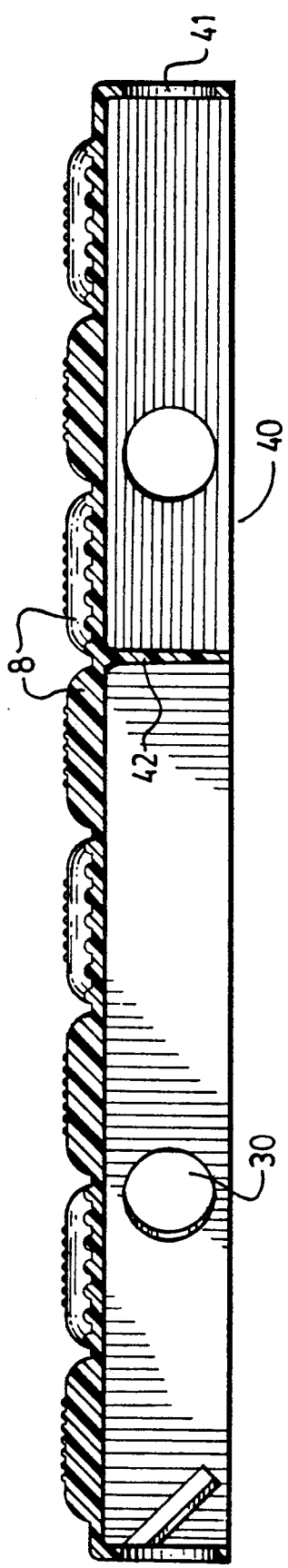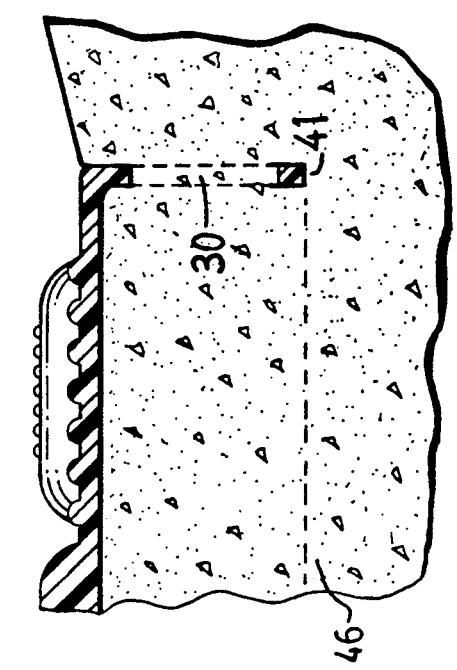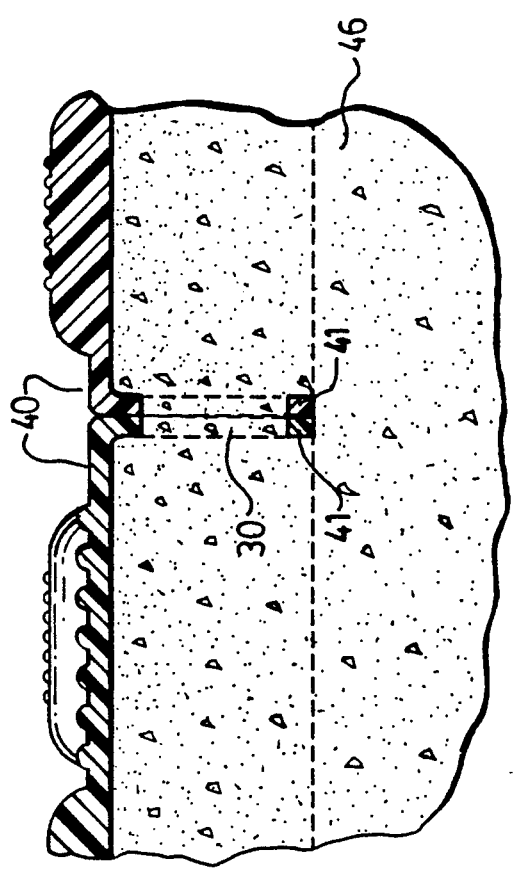

TILES FOR PEDESTRIAN PLATFORMS AND WALKWAYS

REFERENCE TO RELATED APPLICATION

This is a continuation-in-part of application Ser. No. 07/802,228, filed Dec. 4, 1991, now abandoned.

BACKGROUND OF THE INVENTION

1. Field of the invention

This invention relates generally to pedestrian platforms, walkways, and sidewalks and the like, and specifically to textured tiles which assist pedestrians, particularly those who are blind or visually impaired, in following a walkway or in detecting the location of a sidewalk edge, platform edge or other similar hazard.

In public transit facilities, for example, such as subway stations, railway stations and airports, there is often a need for a pedestrian to follow a particular path to arrive at the correct platform or other embarkation point. In the case of a platform, there is also a need to mark the location of the platform edge so that the pedestrian does not accidentally walk off the edge of the platform. The need for marking such walkways and platform edges is of course particularly acute in attempting to make such facilities accessible and safe for blind or visually impaired persons.

The need to indicate the location of hazards applies not only to public transit facilities, of course, but also to loading docks, stages, speaking platforms, stairway tops, sidewalks, curb ramps at roadway crossings, etc..

In many public transportation systems, passenger traffic is increasing. A concomitant societal commitment to increasing access to public facilities has increased the independent mobility of persons traditionally believed to be physically disabled. Thus, there is an increased need for means to indicate to pedestrians the location of walkways and the vicinity of the edge of platforms.

Colored strips and signs are clearly inadequate for blind or visually impaired persons. It is important to provide a tile which can be detected by a blind or visually impaired person by contact through a shoe or with a cane. The tile must be anchored securely to the floor, and must not create a tripping hazard.

2. Description of the Prior Art

Surface markings of a platform or walkway edge involving painted borders or flooring having distinctly different surface properties are known for indicating walkways or for forewarning pedestrians of the vicinity of a platform edge. Many such prior art means lose effectiveness under conditions of heavy passenger traffic and with wear, which can necessitate significant expenditures of time and energy to maintain maximum effectiveness.

Various prior art tiles having raised dimples are known, such as those shown in U.S. Pat. No. 4,715,743 (Schmanski), for example. Such tiles suffer from a number of drawbacks, however, not the least of which is a tendency to peel from the floor after a period of time, and to potentially create a tripping hazard.

SUMMARY OF THE INVENTION

It is an object of the invention to provide tiles which can be installed adjacent to the edge of a pedestrian platform or sidewalk or roadway or the like, to provide an improved warning of the proximity of the edge or other hazard, or which in an adapted version can be used as a guidance path along a walkway or to define a walkway.

In the case of tiles intended for use at a platform edge, the upper surface of each tile has plural rows of spaced buttons projecting upwardly therefrom. In the case of tiles intended to form a guidance path along or to define a walkway, the upper surface of each tile has plural strips of essentially the same cross-section as the buttons, running longitudinally along the tile, i.e. in the direction of the walkway. The buttons or strips provide a distinctively textured surface relative to the texture of the surface of the platform or walkway.

To avoid or minimize any possibility of tripping on the tiles, the height of the buttons or strips preferably is reduced adjacent the edges exposed to pedestrian traffic, e.g. those edges at the periphery of a tiled area which face pedestrian traffic, such that there is a gradual increase in the height of the buttons or strips in moving away from the edges.

If the tiles are to be installed on top of an existing surface, without first mechanically reducing the height of that surface, then the exposed edges of the tiles preferably are angled slightly downwardly from the rest of the tile, such that the edges may be installed flush with the platform or walkway if the surface of the platform or walkway is bevelled slightly beneath the area of the edge.

In order to ensure that the tiles are securely anchored to the floor, each tile preferably includes at least one integral flange projecting downwardly therefrom, adapted to be positioned in a groove of corresponding dimension precut into the platform or walkway.

The tiles thus provide a surface having a texture distinctly different from that of the adjacent platform or walkway. The various features of the invention combine to provide a simple, reliable indicator, with as small a tripping hazard as possible.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawing, in which:

FIG. 17 is a cross-section at 17—17 of FIG. 16;

FIG. 18 is a cross-section showing the edge of a square tiles embedded in concrete;

FIG. 19 is a cross-section showing the edges of two abutting square tiles embedded in concrete;

DETAILED DESCRIPTION OF THE PREFERRED EMBODIMENTS

For convenience, the following description refers first to the edging tile, and then to the walkway designating tile. The description refers to the preferred embodiment of the edging tile as installed on a subway platform. However, it should be apparent that the tiles can be applied to any area where a warning is desired, including loading docks, stages, speaking platforms, stairway tops, landings, docks, piers, steep slopes, and restricted or hazardous areas of any kind, not just platforms having a vertical drop-off, i.e. a vertical face 4. For locations with no drop-off or a drop-off other than vertical, the face-piece 11 could be omitted, or its shape could be adapted to the shape of the surface beyond the rear of the tile.

Figure 1:
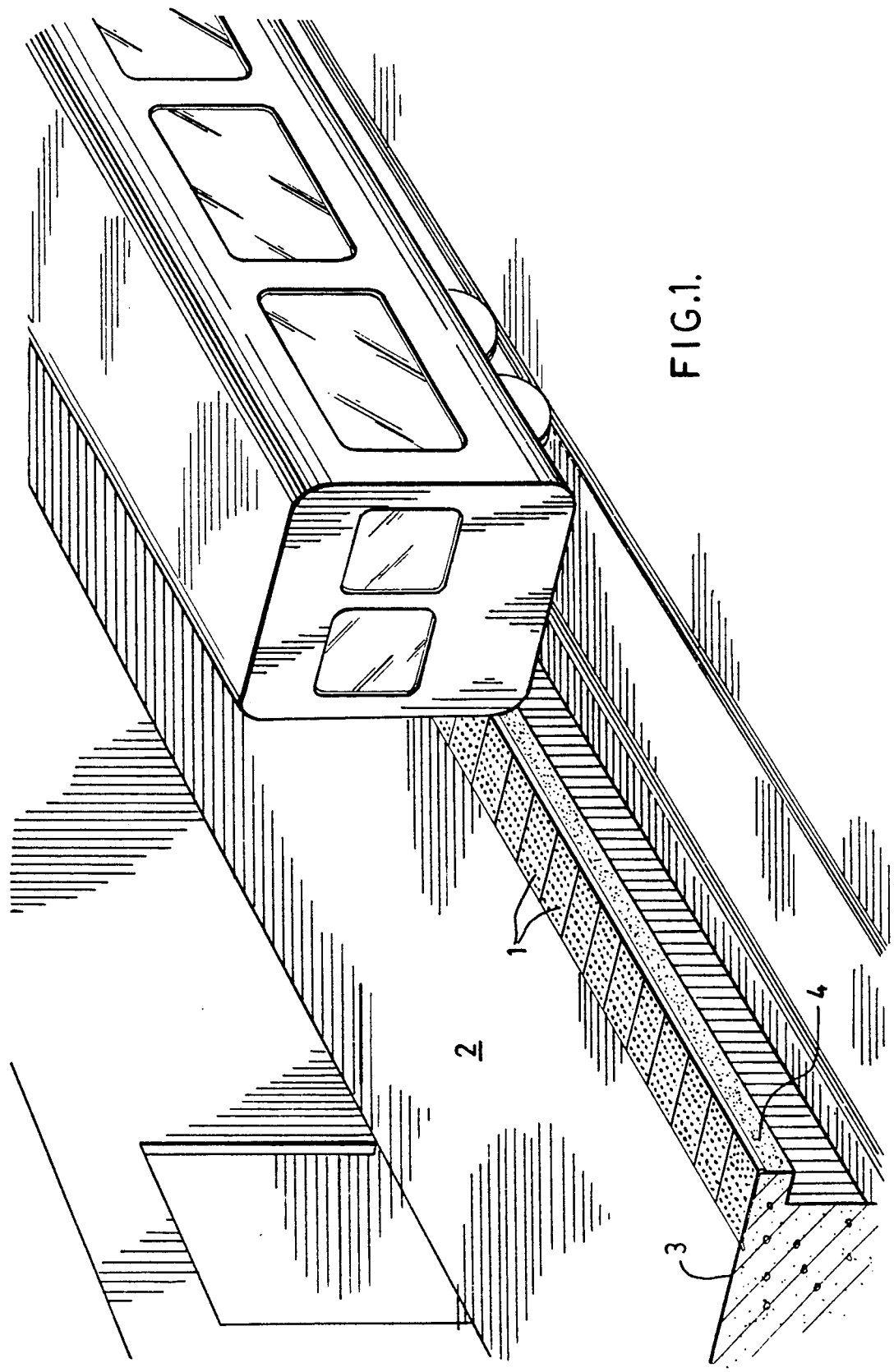
FIG. 1 is a perspective view showing the edging tile installed on a subway platform.

Referring to FIG. 1, the platform edging tile 1 is shown on a subway or other platform 2, the platform having a horizontal surface 3 and a substantially vertical face 4 dropping therefrom. The tile, shown in FIGS. 2-6, has a horizontal portion 5 adapted to overlie the subway platform up to the vertical face, and rear and front edges 6 and 7 respectively, the "front" edge being the one remote from the platform edge.

Figure 2:
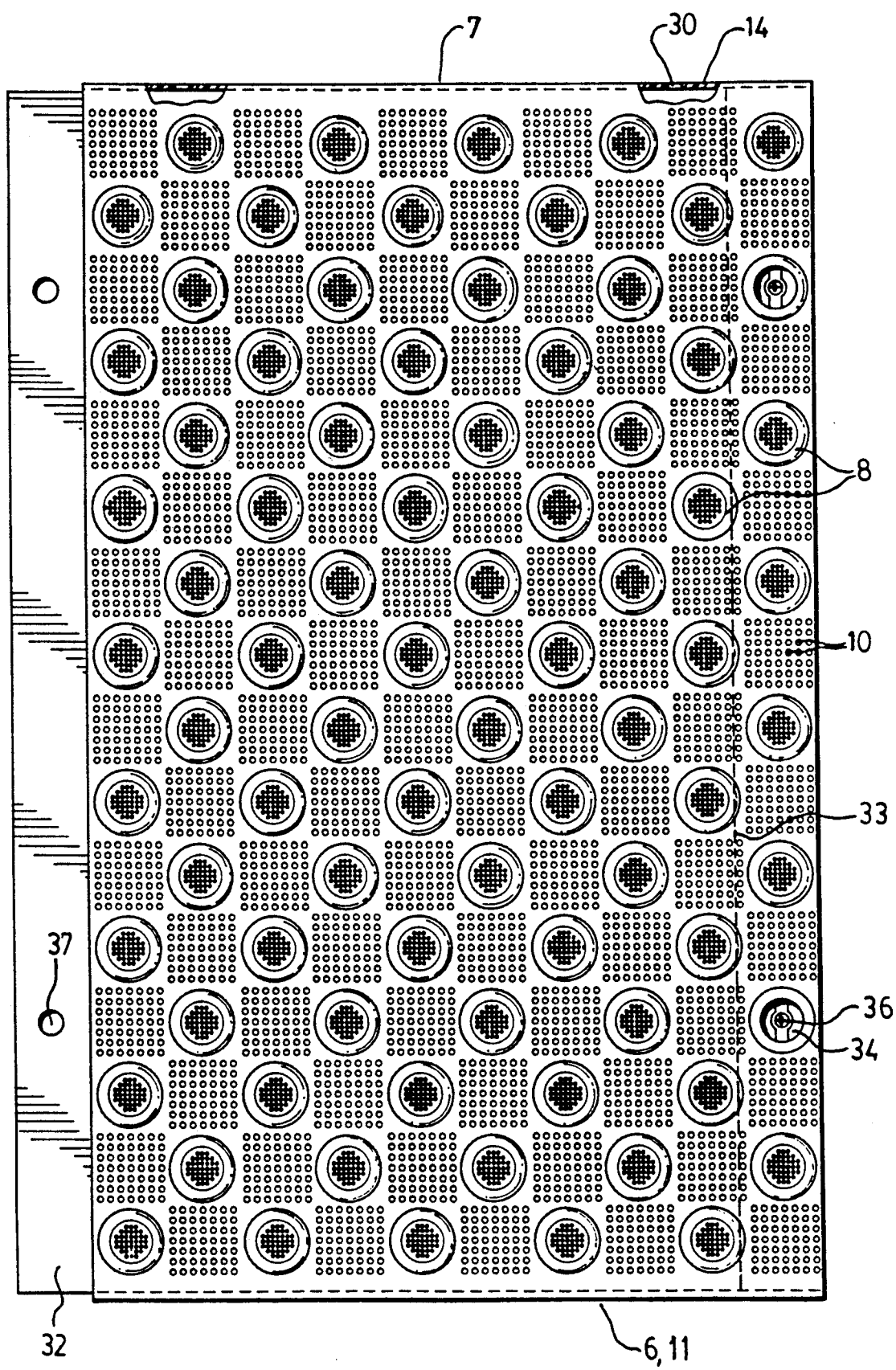
FIG. 2 is a plan view of the tile.
Figure 3:
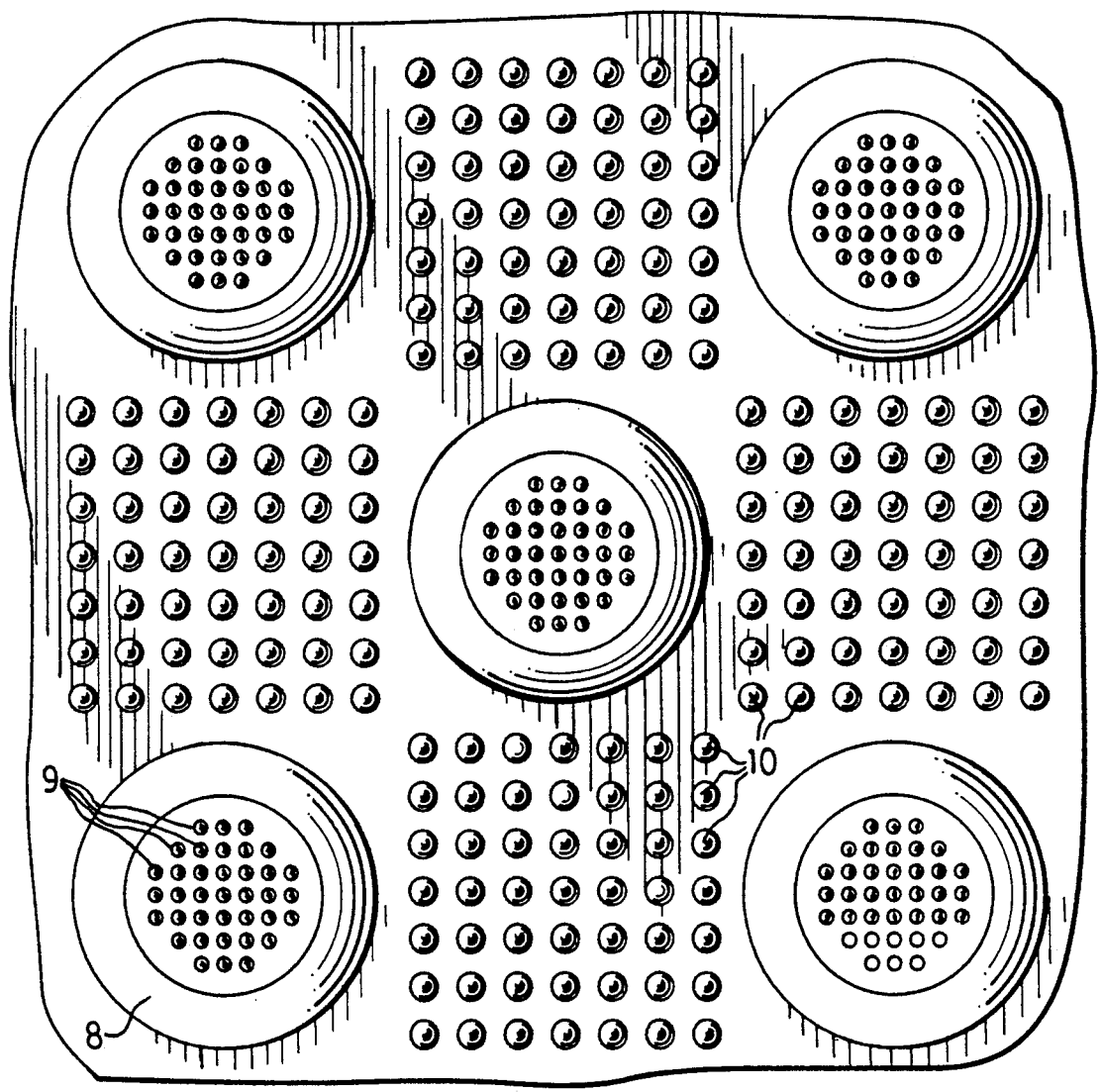
FIG. 3 is a close-up plan view of a portion of the tile.

The surface of the horizontal portion 5 has plural rows of spaced buttons 8 projecting upwardly therefrom, thereby providing a distinctively textured surface relative to the texture of the surface of the platform. As can be seen in FIGS. 2 and 3, the buttons preferably are circular. Buttons in adjacent rows are offset from each other by one-half of the centerline spacing distance. The buttons have generally flat upper surfaces which have texturing means thereon for creating a palpably rough surface texture. As best seen in FIGS. 3-6, the texturing means in the preferred embodiment is provided by rows of semi-spherical raised dimples 9, arranged in a grid pattern.

As can be seen in FIGS. 2 and 3, the areas between buttons preferably also have texturing means consisting of plural rows of spaced dimples 10 projecting upwardly therefrom, to provide slip resistance in those areas (e.g. for women in high heels and to improve manoeuvrability of wheelchairs).

Each tile preferably has a shiplap joint to the adjacent tile, provided by a projection 32 which fits into an undercut area or "rebate" 33 under the adjacent tile. For the last tile in the row, the projection 32 can be cut off.

The tiles preferably are bonded to the floor by the use of a suitable adhesive, such as "Bostic Ultra-Set" (trademark) urethane adhesive. However, for added security, the tiles preferably are also mechanically fastened to the floor. To provide for such mechanical fastening, some of the buttons have a cavity 34 defined in the top thereof, and mechanical anchoring means are employed, such as "Hilti" (trademark) concrete anchoring screws 36. A cap 38, bearing the same pattern of dimples 9 as the top of the other buttons, fits snugly into the recess to prevent vandalism, and is preferably secured there by adhesive.

As illustrated in FIG. 2, there are two such anchoring points on each tile, each above the undercut area. The undercut area is provided with two holes 37 to allow for the passage of the anchoring screws, the holes being slightly oversized to allow for expansion and contraction of the tiles or of the floor under the tiles. Obviously, more anchoring holes and anchoring locations may be provided if desired, and not necessarily just at the edges of the tiles.

To reduce the possibility of tripping, the height of the buttons in one or more rows adjacent the front edge is reduced in height relative to the height of buttons in subsequent rows, so that there is a gradual increase in height. Thus in the preferred embodiment, as seen best in FIGS. 4 and 5, the buttons in the first row adjacent the front edge are only about one-third as high as the buttons above the main area, and the buttons in the second row rear are only about two-thirds as high as the buttons above the main area.

Figure 4:
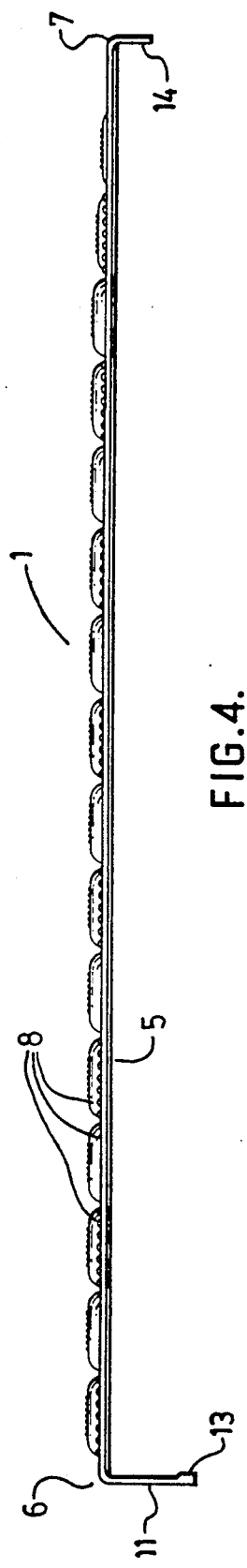
FIG. 4 is a side elevation of the tile.
Figure 6:
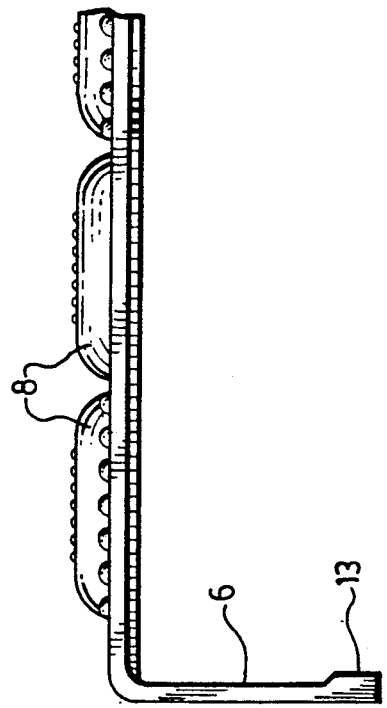
FIG. 6 is a side elevation of the rear portion of the tile.
Figure 7:
FIG. 7 is a cross-section of the tile of FIG. 2, from edge to edge.
Figure 8:
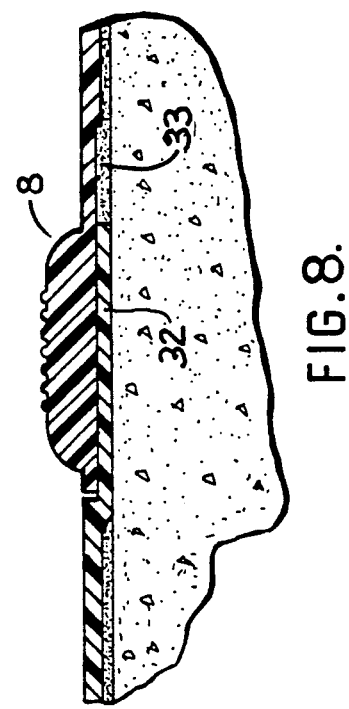
FIG. 8 is a cross-section of the shiplap joint between two adjacent tiles.
Figure 9:
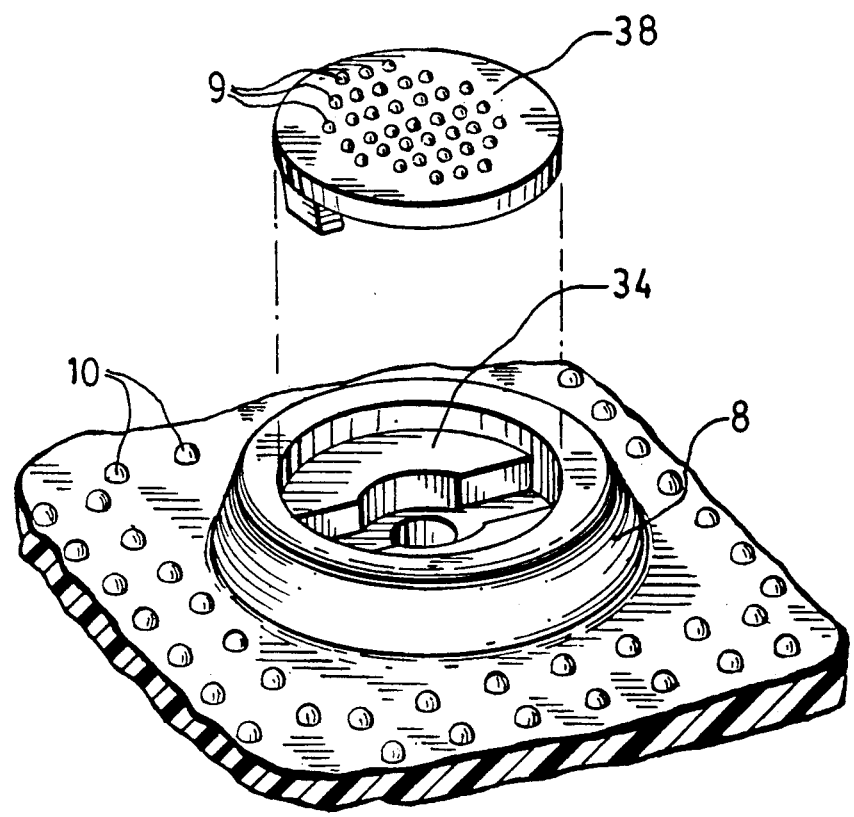
FIG. 9 is a perspective view showing the mechanical fastening means.
Figure 10:
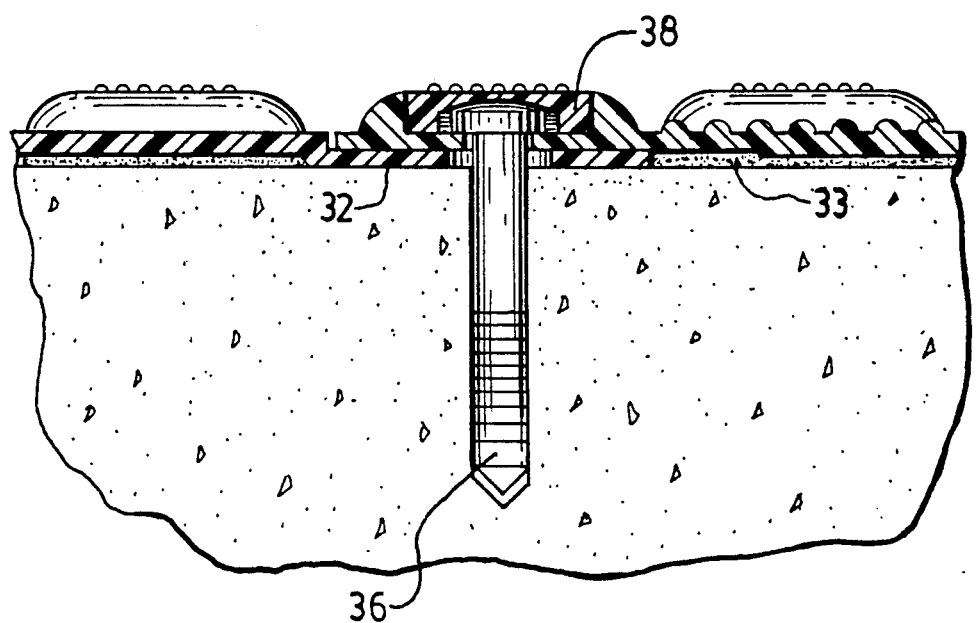
FIG. 10 is a cross-section showing the mechanical fastening means.

The edging tile preferably has an integral face-piece 11, best seen in FIGS. 4 and 6, adapted to overlie the vertical face 4 of the platform and thereby facilitate holding the tile in place. Preferably, an adhesive such as "Bostik Ultra-Set" (trademark) urethane adhesive is used to secure the face-piece to the vertical face 4. The face-piece preferably has a thicker lower section 13 to strengthen and reinforce the bottom edge of the face-piece and to catch and retain adhesive which might otherwise run out from behind the face-piece during installation of the tile. The adhesive may be augmented by or replaced by mechanical fastening means such as "Hilti" (trademark) concrete anchor screws.

Figure 5:
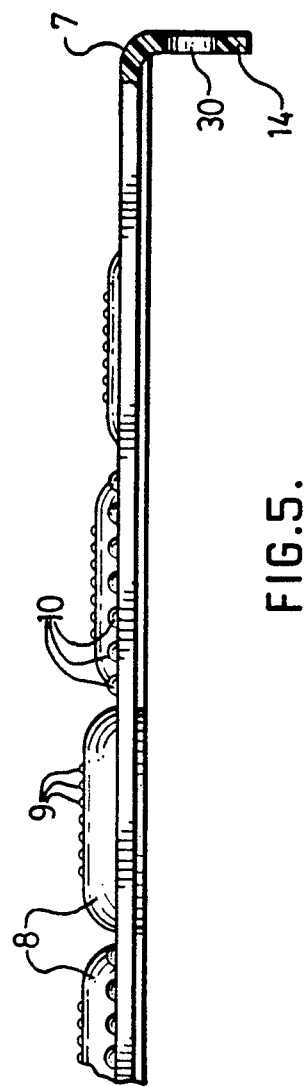
FIG. 5 is a a side elevation of the front portion of the tile.
Figure 11:
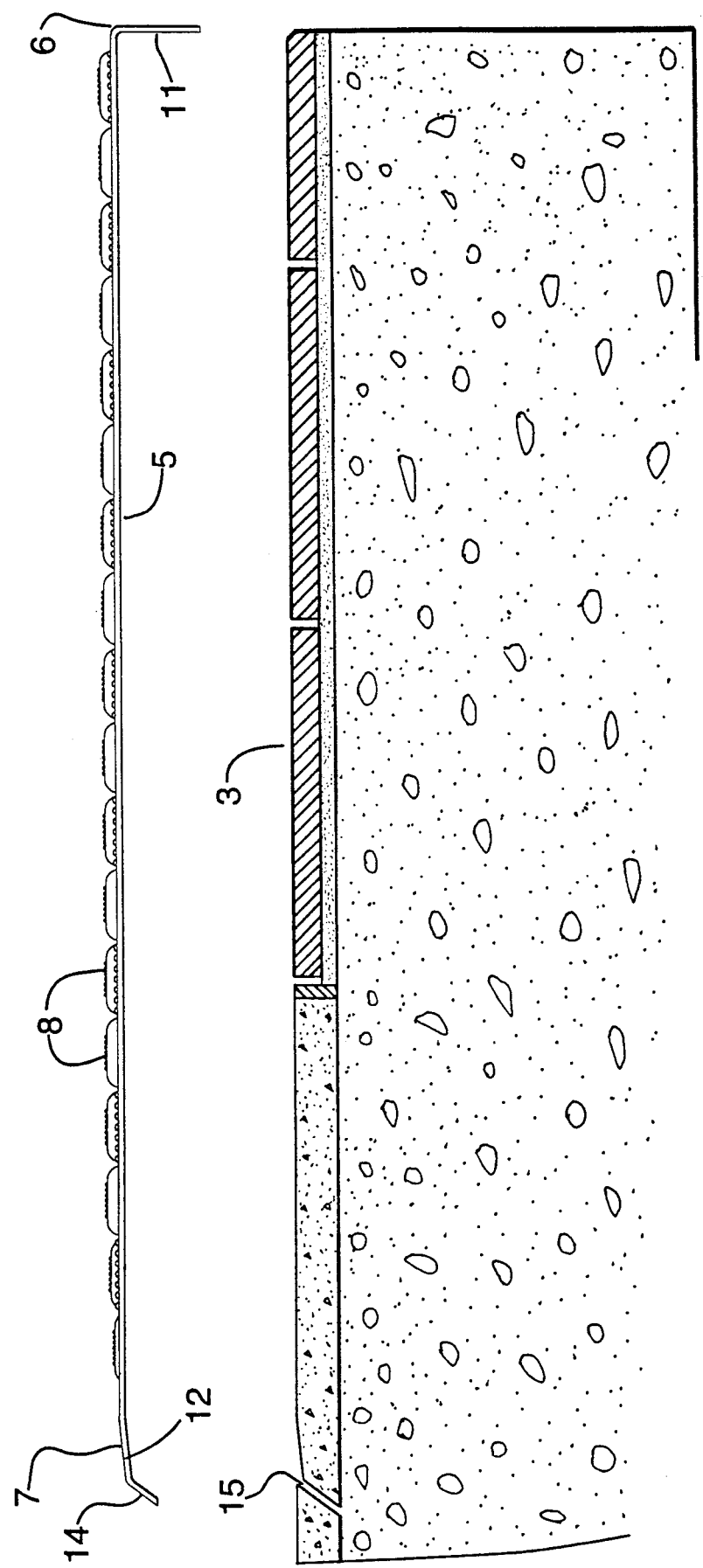
FIG. 11 is a side sectional view of a variation of the edging tile positioned above a platform before installation.
Figure 13:
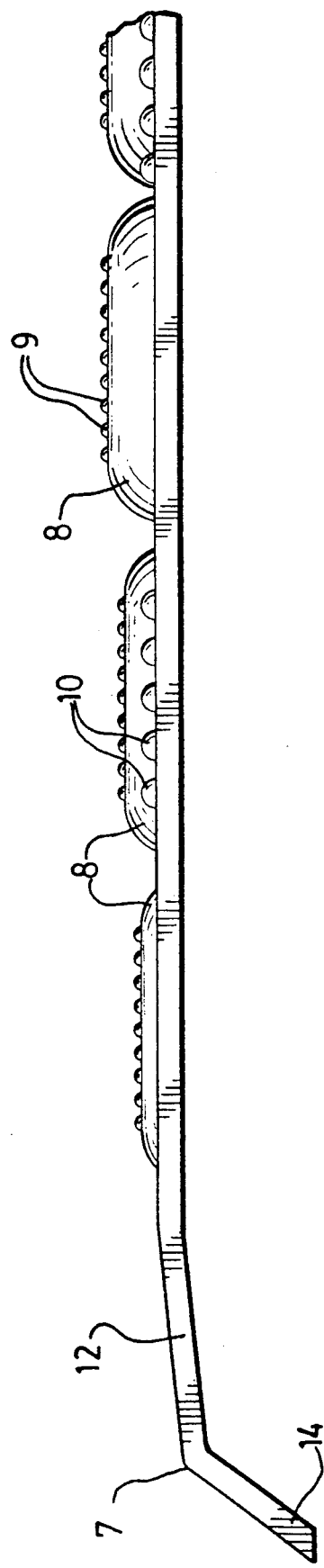
FIG. 13 is an enlarged sectional elevation of a portion of the front edge of the FIG. 11 tile.

Preferably, an integral flange 14 projects downwardly from the front edge 7 to assist in securing the area of the front edge to the platform, and to prevent anything from being wedged underneath the tile to cause it to peel. The tile may be secured to the platform by positioning the flange 14 in a groove 15 of corresponding dimension cut into the platform, and anchoring it therein with a suitable adhesive, such as the above-mentioned "Bostik Ultra-Set" (trademark) urethane adhesive. The flange 14, in addition to aiding in securing the tile, also ensures that there is no exposed edge to potentially cause a problem or to permit vandals to readily pry the tile from the platform. The flange and the corresponding groove 15 may be vertical, as shown in FIGS. 4-6, or may be angled from the vertical, as shown in FIGS. 11 and 13. Angling of the flange permits stacking of the tiles, which facilitates packaging, shipping and handling of the tiles.

Where the tile is intended to be installed on top of an existing surface, without first mechanically reducing the height of that surface, then as seen in FIGS. 11 and 13, the tile preferably has an area 12 adjacent the front edge 7 which is angled slightly downwardly from the rest of the tile, at an angle of approximately 6 degrees from the horizontal, so that the height of the tile at the front edge is substantially at the height of the adjacent platform surface to form a non-trip edge. Machining the surface of the platform to bevel the area underneath this angled area 12 permits this area to be installed flush with the platform.

The fact that the front edge is flush with the adjacent platform and securely "locked" therein not only prevents or minimizes any possibility of tripping, but also minimizes any possibility of the edge of the tile being lifted by mechanical cleaning equipment.

The tiles of the present invention can be made of vinyl, rubber, urethane, ceramic or cast composite materials or the like. The edging tile is preferably made entirely of yellow thermoset glass-reinforced plastic composite material having the textured surface pattern as described. In addition, a micro-thin film may be applied to the upper surface if desired, to provide enhanced abrasion resistance characteristics. Because the entire tile preferably is brightly colored, it serves to visually alert sighted and visually impaired pedestrians of the vicinity of the subway platform edge. The textured surface provides a tactile signal as well, which is particularly important for the visually impaired. The buttons can be felt through most if not all footwear, and can also be readily detected by a "white cane" of the type frequently used by the blind or visually impaired. Certain types of conventional canes can detect the buttons very readily, while types may pass between the buttons and can readily detect the dimples in the areas between buttons. It is therefore preferable to have these dimples in the areas between buttons, and not just on the surface of the buttons themselves.

As an alternative to a single bright color, a scheme of alternating contrasting colors could be used to create a distinctive pattern, if desired.

Figure 12:
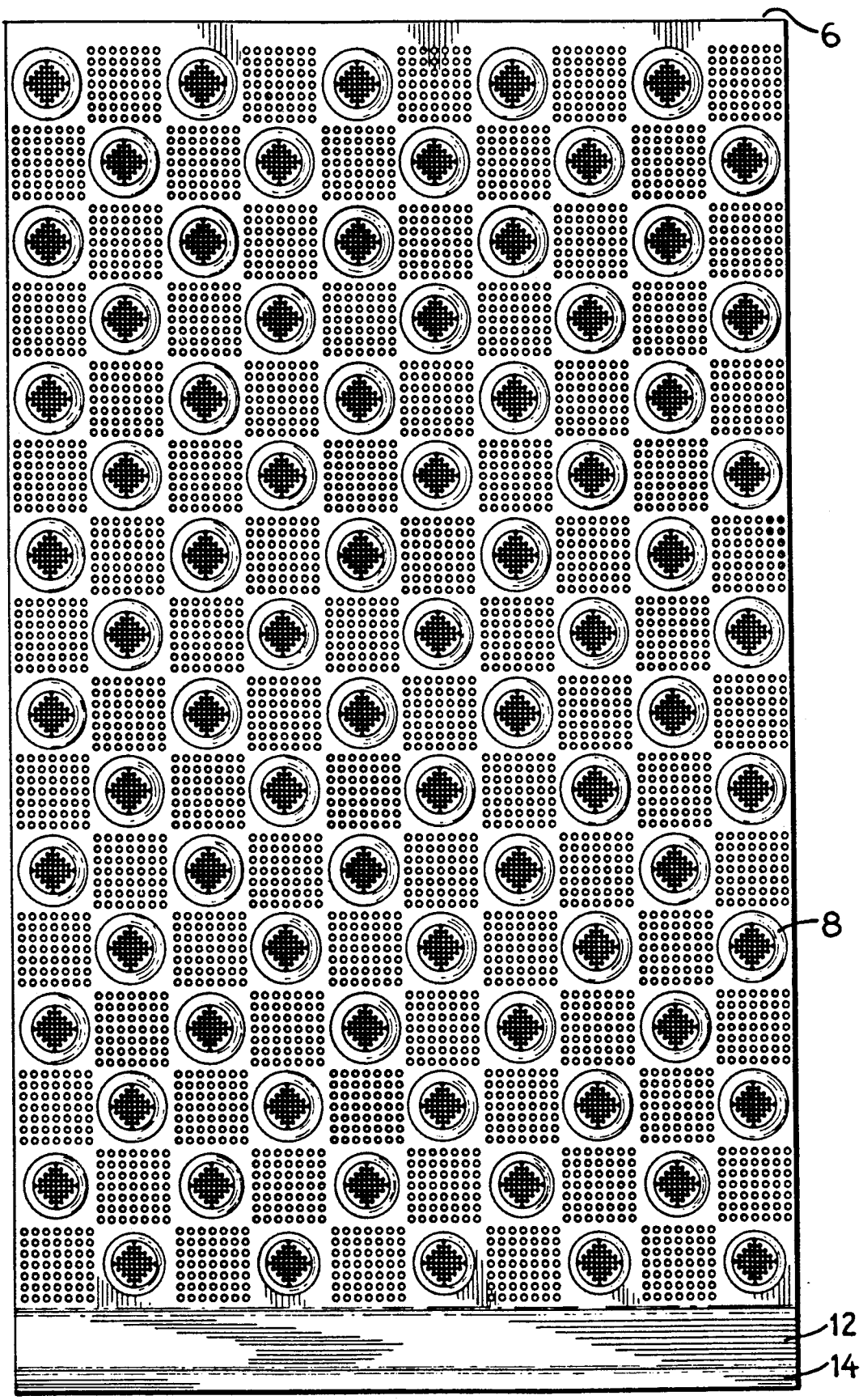
FIG. 12 is a plan view of the FIG. 11 tile.

It will be appreciated that a wide range of dimensions may be suitable for the edging tile and for the buttons. However, in the embodiment of the tile shown in FIGS. 11–13, for example, key dimensions are as follows:

| | |
|---|---|
| Forward to rear dimension: | 24.375 inches |
| Tile width: | 14.125 inches |
| Tile thickness: | 0.100 inches |
| Rear face-piece dimensions: | 2.1 inches long by 0.125 inches thick |
| Button diameter (base): | 1.325 inches |
| Button diameter (top): | 0.875 inches |
| Button height (excluding dimples): | 0.200 inches |
| Button height (first row from front edge): | 0.066 inches |
| Button height (second row from front edge): | 0.132 inches |
| Height of dimples 9: | 0.030 inches |
| Diameter of dimples 9: | 0.062 inches |
| Height of dimples 10: | 0.062 inches |
| Diameter of dimples 10: | 0.0125 inches |
| Spacing between dimples 10 (centerline to centerline): | 0.200 inches |
| Spacing of buttons in the same row (centerline to centerline): | 2.800 inches |
| Spacing of rows (centerline to centerline): | 1.400 inches |
| Length of angled area 12: | 1.085 inches |
| Angle of angled area from horizontal: | 6 degrees |
| Distance of top of front edge of angled area 12 below top of main portion of tile: | 0.110 inches |
| Angle of flange 14 from the horizontal: | 53 degrees |
| Vertical dimension component of flange 14: | 0.500 inches |

Figure 14:
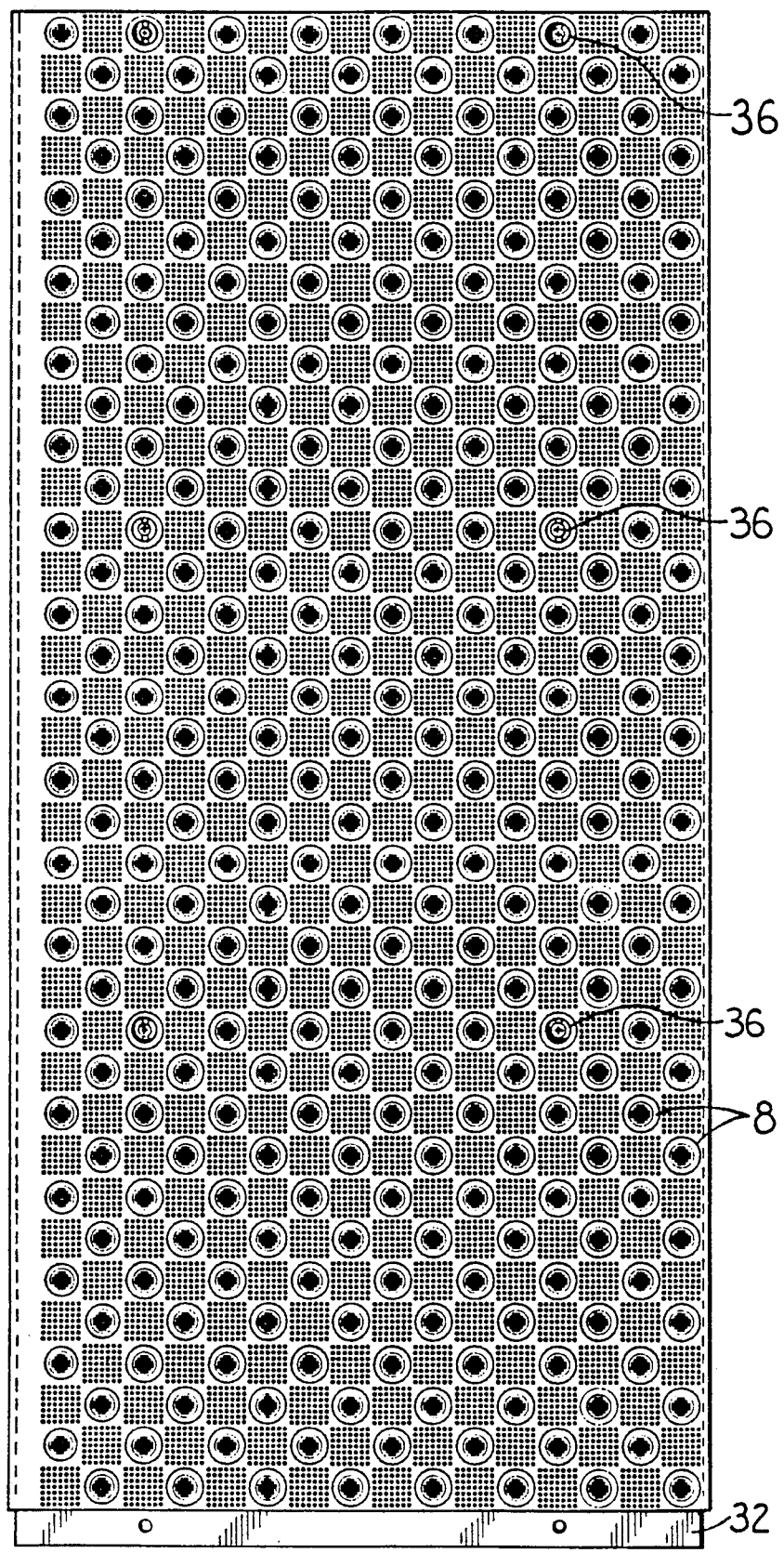
FIG. 14 is a plan view of a longer version of the FIG. 2 tile.

It will be appreciated that the dimensions can be varied widely, as desired to suit the particular application. For example, FIG. 14 illustrates a tile which is 48 inches from edge to edge, and approximately 24 inches from front to back. The mechanical fastening locations with anchoring screws 36 are shown without the caps 38.

To install the tile, a groove 15 is cut into the platform at an appropriate distance away from the platform edge to receive the integral flange 14 of the tile. Where the tile has an angled area 12, the platform is then ground to form a gradual bevelled slope where the angled area of the tile will rest. The existing platform surface is lightly ground to clean it before receiving the tile. The groove is filled with adhesive prior to receiving the flange. Adhesive is then applied to the surface of the platform, and the tile is positioned. The tile is cured in place before use by pedestrians. The groove would then be filled flush to the surface with a resilient sealant, such as an epoxy grout, preferably colored to match the tile.

Where the tile does not have an angled area 12, the floor in the area of the tiles preferably is taken down by the thickness of the tile, through whatever mechanical process may be required to do so, so that the edge of the tile does not project above the surface of the adjacent floor.

In the case of a new floor, it will be apparent that the floor could be poured or otherwise prepared with the bevelled slope already in place. Where no flooring has been put in place, it would be possible to apply the marking tile directly to the floor instead of on top of existing flooring, with the floor under the marking tile location being poured to a different height than elsewhere if necessary in order to match the marking tile height to the height elsewhere. It will generally be obvious in any given situation as to how to prepare the floor for ideal installation of the tiles.

Figure 15:
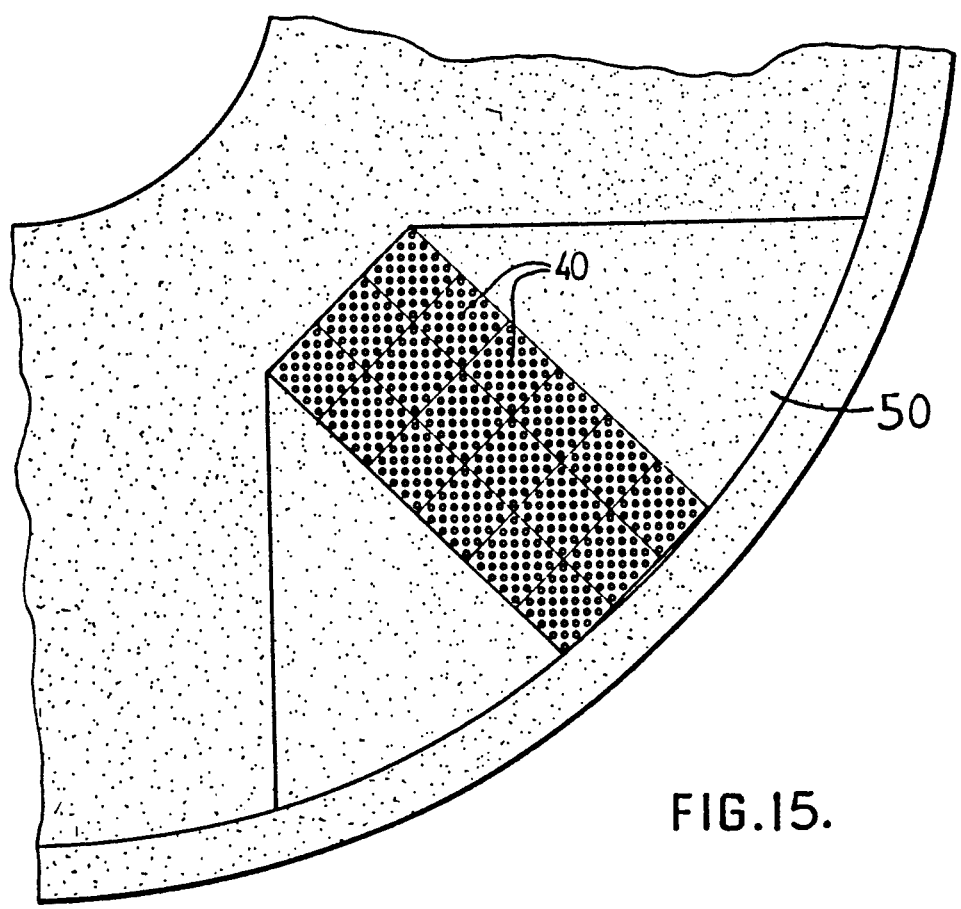
FIG. 15 is a plan view showing square tiles installed at a curb cut.
Figure 16:
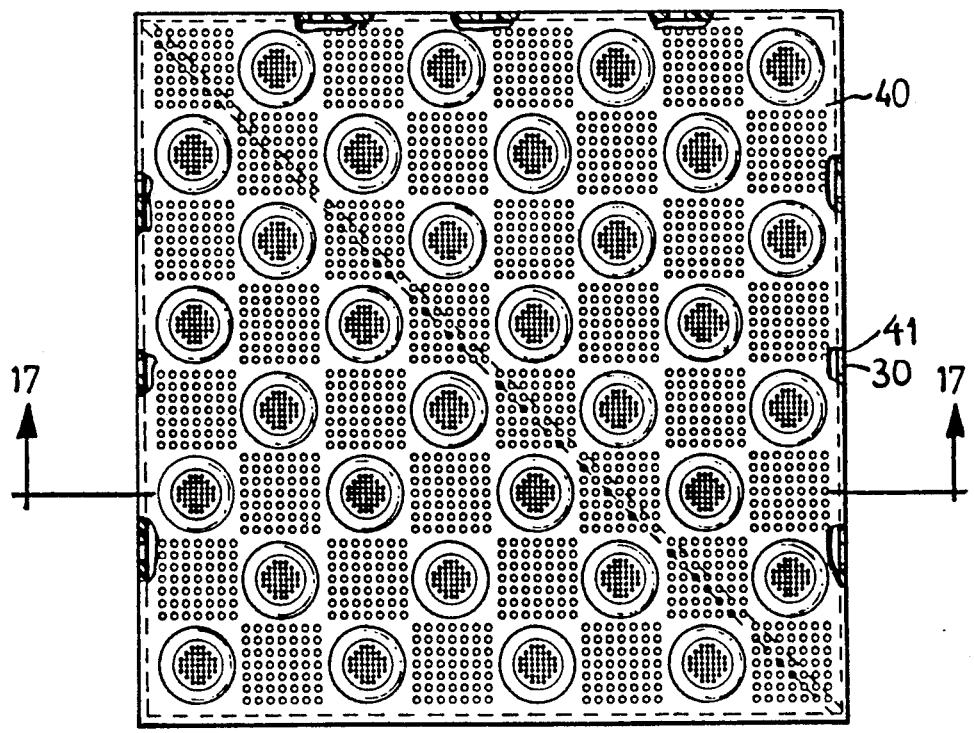
FIG. 16 is a plan view of a square tile.

Referring to FIGS. 15–20, several square tile designs will now be described. FIG. 15 shows a number of square tiles 40 installed in a typical "curb cut" 50, i.e. the depressed area now common at intersections to facilitate movement by disabled persons, particularly those in wheelchairs. FIG. 16 shows a typical tile in plan view. Flanges 41 preferably project downwardly from each edge to assist in anchoring the tile. A diagonal flange 42 is also preferably provided. The flanges have holes 30 through them to assist in anchoring the tile in freshly poured concrete, as can be seen in FIGS. 18 and 19. The holes on the perimeter of the tiles also permit the air to flow out from under the tiles when they are pressed into the concrete. The same tiles can also be used to prefabricate "pavers", i.e. concrete tiles with the tile of the invention incorporated into the upper surface, so that a warning area can be provided simply by laying down one or more rows of these pavers in appropriate locations.

Where the tiles are intended for use in retrofit situations, grooves may be cut to accommodate the flanges, or a version of the tile having no flanges may be used.

For applications such as the curb cut shown in FIG. 15, tiles of various configurations may be used. For example, the tiles around the perimeter preferably incorporate the feature of having buttons of gradually increasing height, to reduce the possibility of tripping.

Tiles at the corners may have this feature along both outside edges. Tiles in the middle of the array may have buttons of uniform height.

Figure 20:
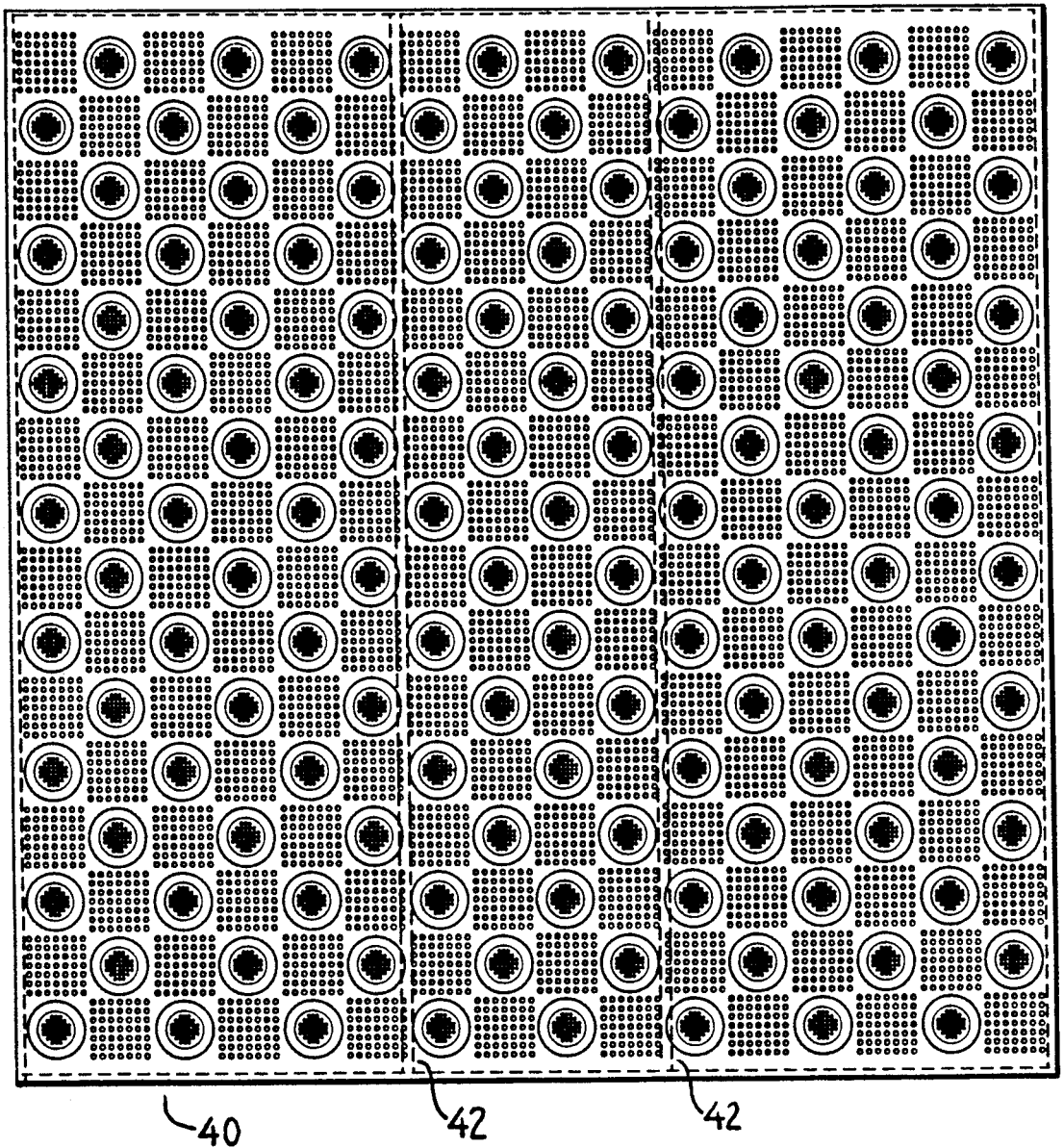
FIG. 20 is a plan view of a square tile with ribs parallel to the side edges.

FIG. 20 shows another square tile, nominally 24 inches square, having edge flanges and several interior flanges 42 parallel to the edges of the tile. Cutting the tile adjacent to any one of the interior flanges permits full-featured tiles of varying length to be produced, to facilitate fitting the tiles into a location of fixed length. In combination with employing a little more or less "play" in positioning the individual tiles, the variety of tile dimensions so made possible permits any overall length to be accommodated.

Figure 21:
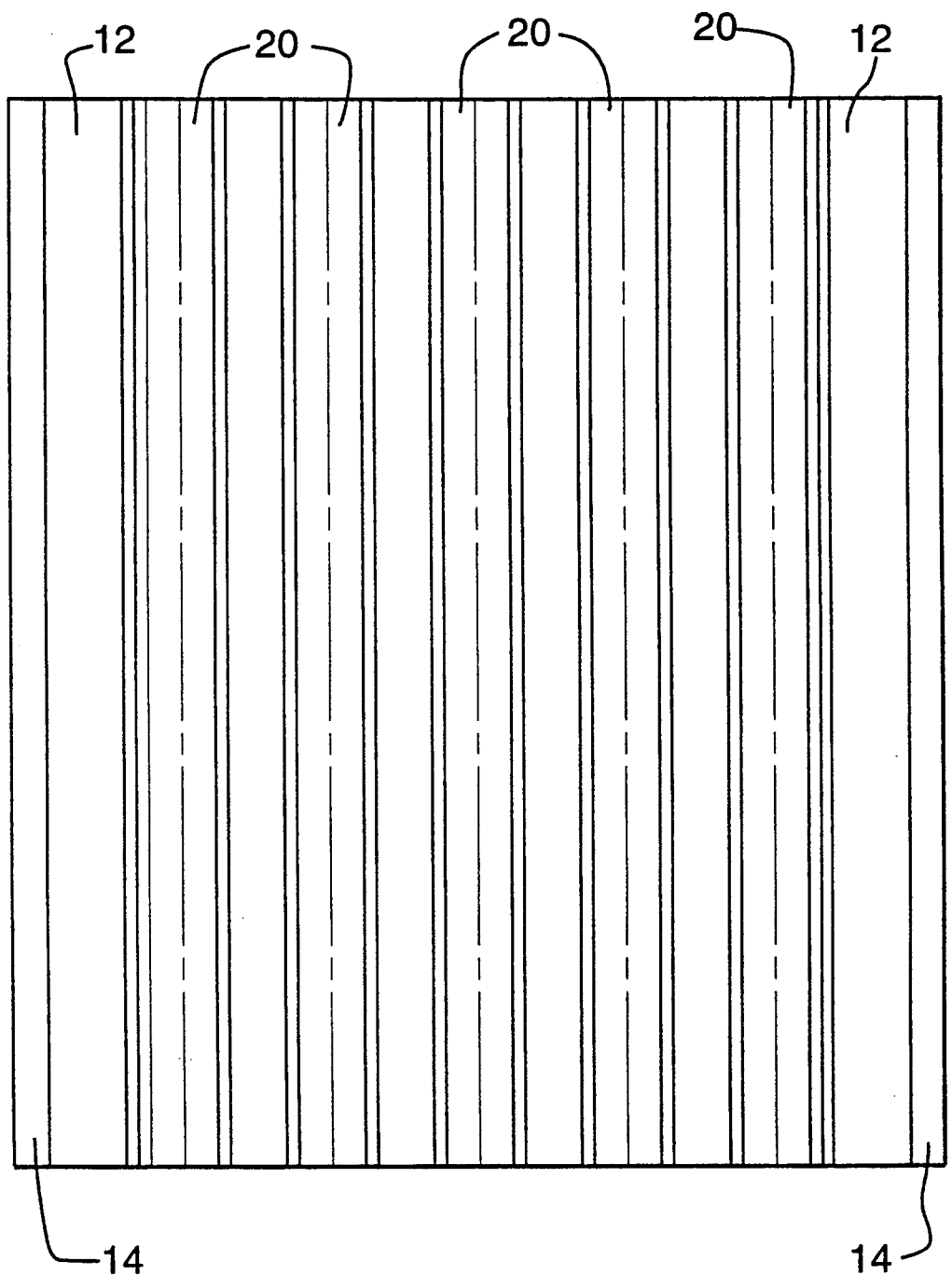
FIG. 21 is a plan view of a tile adapted for use as a walkway designator.
Figure 22:
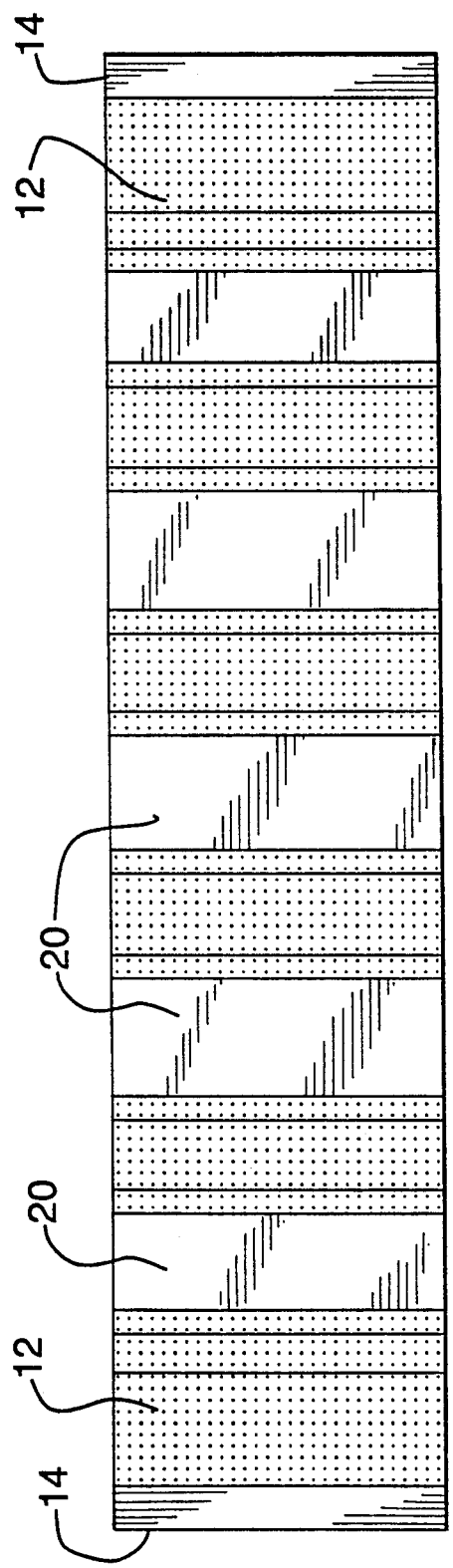
FIG. 22 is an enlarged plan view of the FIG. 21 tile.
Figure 23:
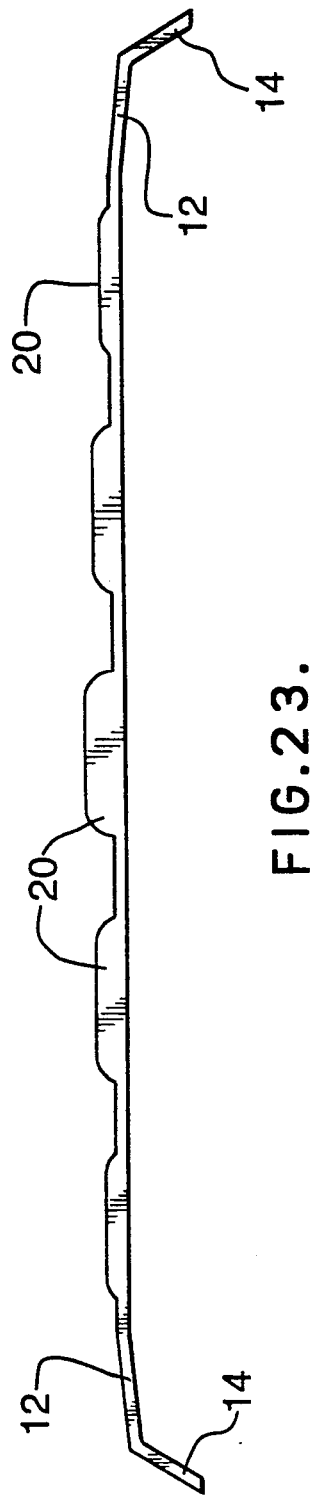
FIG. 23 is a cross-section of the FIG. 21 tile.

Referring now to FIGS. 21-23, it will be readily appreciated how the tile as intended for use as a platform edging can be adapted for use to designate a walkway. Essentially, each lateral edge is identical to the front edge of an edging tile, i.e. it has an angled area 12 so that the edge can be installed flush with the adjacent walkway, and each edge has a downwardly projecting flange 14 to position in a groove cut into the walkway floor. The flange 14 in this case may be vertical or at least not as angled as the flange in the case of the edging tile, since an excessive angle obviously may make installation difficult. At least some angle is possible because the tile can be flexed to a certain degree.

Although buttons essentially identical to those in the edging tile could be used, it is preferable in this case to use strips 20 instead, which strips may be essentially identical in cross-section to the buttons. With strips instead of buttons, it is relatively easy for a blind or visually impaired person to position his or her can between the strips and simply run the cane along between adjacent strips.

Since there is no serious hazard as in the case of a platform edge, and since it is desired that the person be able to readily slide a cane along between adjacent strips, the dimples are omitted from the strips and between the strips.

To minimize any tripping hazard, the height of the strips increases gradually moving in from the lateral edges, in the same manner as with the buttons in the case of the platform edging tiles. It is not intended that the person will actually walk on the tiles, but rather that the person will walk along beside a row of tiles, using a cane, or between two rows of tiles, with or without a cane.

It will be appreciated that the above description relates to the preferred embodiments of the invention, by way of example only. Many variations will be obvious to those knowledgeable in the field, and such obvious variations are within the scope of the invention as claimed.

What is claimed as the invention is:

1. A textured tile for installation on a platform or walkway surface, comprising a generally planar element with an upper surface and a lower surface, said upper surface having a plurality of upward projections therefrom to provide a distinctive texture relative to the surface of the platform or walkway, said tile having two opposite side edges intended for alignment with corresponding side edges of other tiles, and front and rear edges at least one of which faces oncoming pedestrian traffic, in which said upward projections adjacent each said traffic-facing edge are lower in height than said upward projections elsewhere on the tile, the tile thus presenting oncoming pedestrians with upward projections having a gradual height increase rather than a sudden height increase, thus decreasing the likelihood of tripping.

2. A textured tile as recited in claim 1, in which said upward projections comprise plural rows of spaced-apart buttons projecting upwardly from the tile, said rows being arranged parallel to each said traffic-facing edge and including, in sequence progressing inwardly away from each said traffic-facing edge, at least a first row adjacent said edge, a second row adjacent said first row, and a third row adjacent said second row, said buttons in the first row being lower in height than said buttons in the second row.

3. A textured tile as recited in claim 2, in which said buttons have generally horizontal upper surfaces, and in which both said upper surfaces of said buttons and the upper surface of said tile between said buttons are provided with a plurality of small upward projections to texture said surfaces.

4. A textured tile as recited in claim 2, in which said buttons are approximately in the range of one-half to two inches in diameter, in which the height of said buttons in said first row adjacent said traffic-facing edge is approximately 1/16 inch above the surface of the tile, the height of said buttons in said second row is approximately ⅛ inch above the surface of the tile, and the height of said buttons in the third row in from said traffic-facing edge is approximately 1/5 inch above the surface of the tile.

5. A textured tile as recited in claim 3, in which said buttons are approximately in the range of one-half to two inches in diameter, in which the height of said buttons in said first row adjacent said traffic-facing edge is approximately 1/16 inch above the surface of the tile, the height of said buttons in said second row is approximately ⅛ inch above the surface of the tile, and the height of said buttons in the third row in from said traffic-facing edge is approximately 1/5 inch above the surface of the tile.

6. A textured tile as recited in claim 1, said tile having an area adjacent each said traffic-facing edge angling slightly downwardly such that the upper surface of said tile at each said traffic-facing edge is substantially at the same height as the lower surface of said tile except beneath said downwardly-angled area, whereby each said traffic-facing edge may be installed flush with said platform or walkway if the surface of said platform or walkway is bevelled beneath each said downwardly-angled area.

7. A textured tile as recited in claim 2, said tile having an area adjacent each said traffic-facing edge angling slightly downwardly such that the upper surface of said tile at each said traffic-facing edge is substantially at the same height as the lower surface of said tile except beneath said downwardly-angled area, whereby each said traffic-facing edge may be installed flush with said platform or walkway if the surface of said platform or walkway is bevelled beneath each said downwardly-angled area.

8. A textured tile as recited in claim 3, said tile having an area adjacent each said traffic-facing edge angling slightly downwardly such that the upper surface of said tile at each said traffic-facing edge is substantially at the same height as the lower surface of said tile except beneath said downwardly-angled area, whereby each said traffic-facing edge may be installed flush with said platform or walkway if the surface of said platform or walkway is bevelled beneath each said downwardly-angled area.

9. A textured tile as recited in claim 4, said tile having an area adjacent each said traffic-facing edge angling slightly downwardly such that the upper surface of said tile at each said traffic-facing edge is substantially at the same height as the lower surface of said tile except beneath said downwardly-angled area, whereby each said traffic-facing edge may be installed flush with said platform or walkway if the surface of said platform or walkway is bevelled beneath each said downwardly-angled area.

10. A textured tile as recited in claim 5, said tile having an area adjacent each said traffic-facing edge angling slightly downwardly such that the upper surface of said tile at each said traffic-facing edge is substantially at the same height as the lower surface of said tile except beneath said downwardly-angled area, whereby each said traffic-facing edge may be installed flush with said platform or walkway if the surface of said platform or walkway is bevelled beneath each said downwardly-angled area.

11. A textured tile as recited in claim 1, further comprising an integral flange projecting downwardly from each said traffic-facing edge, adapted to be positioned in a groove of corresponding dimension to be cut into said platform or walkway.

12. A textured tile as recited in claim 1, where said opposite side edges are configured such that adjacent tiles may be joined by a shiplap joint, said tile therefore having a projection adjacent said lower surface extending away from one said side edge, and a recess of similar dimensions to said projection defined in said lower surface adjacent said other side edge.

13. A textured tile as recited in claim 1, further comprising mechanical fastening means passing through said tile for securing said tile to said platform or walkway.

* * * * *